(12) United States Patent
Chinta et al.

(10) Patent No.: US 9,191,397 B2
(45) Date of Patent: Nov. 17, 2015

(54) EXTENSION MODEL FOR IMPROVED PARSING AND DESCRIBING PROTOCOLS

(75) Inventors: Ramesh Chinta, Sammamish, WA (US); Crystal Li, Redmond, WA (US); Vladimir Lifliand, Sammamish, WA (US); Narasimha Rao S. S. Nagampalli, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1528 days.

(21) Appl. No.: 12/147,895

(22) Filed: Jun. 27, 2008

(65) Prior Publication Data

US 2009/0327993 A1 Dec. 31, 2009

(51) Int. Cl.
G06F 15/173 (2006.01)
H04L 29/06 (2006.01)
H04L 12/26 (2006.01)

(52) U.S. Cl.
CPC ............ *H04L 63/1408* (2013.01); *H04L 43/18* (2013.01); *H04L 69/03* (2013.01)

(58) Field of Classification Search
USPC ............................... 709/238; 717/104; 706/47
See application file for complete search history.

(56) References Cited

U.S. PATENT DOCUMENTS

| 5,748,980 | A  | * | 5/1998  | Lipe et al. ........................ 710/8 |
| 6,625,804 | B1 |   | 9/2003  | Ringseth et al. |
| 7,111,286 | B2 |   | 9/2006  | Schrader et al. |
| 7,117,436 | B1 | * | 10/2006 | O'Rourke et al. ............ 715/205 |
| 7,187,694 | B1 |   | 3/2007  | Liao |
| 7,194,733 | B2 |   | 3/2007  | Ringseth et al. |
| 7,308,715 | B2 |   | 12/2007 | Gupta et al. |
| 7,349,761 | B1 | * | 3/2008  | Cruse ............................ 700/276 |
| 7,516,400 | B2 | * | 4/2009  | Ovetchkine et al. .......... 715/234 |
| 7,610,188 | B2 | * | 10/2009 | Weise ................................ 704/8 |
| 7,743,040 | B2 | * | 6/2010  | Rys et al. ...................... 707/705 |
| 7,818,330 | B2 | * | 10/2010 | Wu et al. ....................... 707/755 |
| 7,873,717 | B1 | * | 1/2011  | Woolway ....................... 709/223 |
| 2005/0154765 | A1 | * | 7/2005 | Seitz et al. .................. 707/104.1 |
| 2006/0184353 | A1 | * | 8/2006 | Weise ................................ 704/4 |
| 2006/0236222 | A1 |   | 10/2006 | Marmigere et al. |
| 2006/0280178 | A1 |   | 12/2006 | Miller et al. |
| 2007/0016897 | A1 |   | 1/2007 | Todd |
| 2008/0052780 | A1 |   | 2/2008 | Cao et al. |

(Continued)

OTHER PUBLICATIONS

Pang et al.,"binpac: A yacc for Writing Application Protocol Parsers", ACM, Oct. 2006, pp. 12.

(Continued)

*Primary Examiner* — Ranodhi Serrao
(74) *Attorney, Agent, or Firm* — Timothy Churna; Kate Drakos; Micky Minhas

(57) ABSTRACT

Described is a technology by which an engine parses data based upon modules arranged in a tree-like model structure. Only those modules that meet a condition with respect to the data are invoked for processing the data. Each child module specifies a parent module and specifies a condition for when the parent is to invoke the child module. As a module processes the data, if a child module's specified condition is met, it invokes the corresponding child module, (which in turn may invoke a lower child if its condition is met, and so on). When the data corresponds to protocols, the model facilitates protocol layering. A top level parent may represent one protocol (e.g., TCP), a child beneath may represent a lower-layer protocol (e.g., HTTP), whose children may handle certain types of HTTP commands, or correspond to a signature that the child module is programmed to detect.

20 Claims, 6 Drawing Sheets

(56) References Cited

U.S. PATENT DOCUMENTS

| | | | |
|---|---|---|---|
| 2008/0281834 A1* | 11/2008 | Wu et al. | 707/100 |
| 2010/0153219 A1* | 6/2010 | Mei et al. | 705/14.73 |
| 2010/0332608 A1* | 12/2010 | Wei et al. | 709/206 |
| 2011/0167088 A1* | 7/2011 | Warren et al. | 707/781 |
| 2011/0271248 A1* | 11/2011 | Simernitski | 717/108 |
| 2012/0110437 A1* | 5/2012 | Pan et al. | 715/235 |
| 2012/0124086 A1* | 5/2012 | Song et al. | 707/769 |

OTHER PUBLICATIONS

Merwe et al., "mmdump: A Tool for Monitoring Internet Multimedia Traffic", ACM SIGCOMM Computer Communication Review, vol. 30, No. 5, 2000, pp. 48-59.

Estevez-Tapiador et al.,"Detection of Web-based Attacks through Markovian Protocol Parsing", Proceedings of the 10th IEEE Symposium on Computers and Communications (ISCC 2005), 2005, IEEE, pp. 6.

* cited by examiner

EXTENSION MODEL FOR IMPROVED PARSING AND DESCRIBING PROTOCOLS

BACKGROUND

To protect against malicious content, intrusion prevention systems (and similarly intrusion detection systems) use an engine to detect signatures of known malicious content. To detect such content, the various communication protocols on the network need to be understood and modeled.

Creating accurate models of protocols and interactions among them is a classic problem. The effectiveness of an IDS/IPS solution is directly correlated to how accurately they describe protocols. Incomplete or incorrect parsing or modeling of protocol behavior may cause attacks to go undetected and/or cause erroneously-reported intrusions to be flagged on legitimate traffic.

At the same time, a parsing operation, whether for network protocols or otherwise, is generally a very expensive operation. In many situations, full or complete parsing is not necessary in order to retrieve the desired information. Designing an optimal parser for a specific usage is relatively simple; however, extending the concept of optimized parsing to generic parsing is a significant challenge. This is pertinent to optimizing protocol parsing as well as to many other applications that require parsing of possibly many different forms of information.

There are thus challenges in creating an accurate model for use in systems that deal heavily with protocols. Many of these challenges are directed towards having to create a model with a reasonable balance between generality and completeness. As mentioned above, performance is also a key issue due to the expensive nature of parsing. Thus, a related problem is how to accurately describe a protocol with enough flexibility to be sufficiently general for a large class of common protocols while, still maintaining good performance across them.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which data is parsed based upon modules arranged in a tree-like structure, in which only modules that meet a condition with respect to the configuration are invoked for processing the data. Each child module specifies a parent module and specifies a condition for when the parent module is to invoke the child module. As a module processes the data, if a specified condition is met, the parent invokes the corresponding child module that specified that condition. In turn that child module may be a parent to another child module that is also invoked when its specified condition is met.

In one alternative aspect in which the data corresponds to network traffic, the model facilitates protocol layering. For example, a top-level module may correspond to TCP, which may invoke a child module corresponding to HTTP when the network traffic corresponds to a particular port (e.g., port 80). Another attribute of the incoming or outgoing traffic (e.g., IP address) may be similarly used to invoke a child module. The HTTP module may be a parent module to child modules, one of which may handle a certain types of HTTP command, for example, or may correspond to a signature that the child module is programmed to detect.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a protocol definition (PD)/protocol definition extension (PDE) model that may be leveraged in any situation that requires parsing. The model may be leveraged to perform a reduced amount of parsing, but still fully-flexible parsing, for more optimal parsing performance.

One extension model described herein is directed towards solving the issues of performance and generality. From a high level, the exemplified extension model conceptualizes each protocol as a basic core definition, which is extended by any number of definition extension modules. Extension modules can then be further extended by other extension modules, basically constructing a tree structure with unlimited depth.

As will be understood, extension modules also provide a means to deal with encoding. For further extensibility, also described is the use of signatures, which correspond to procedural code modules that can perform more complex condition tests. One usage of such modules in a security scenario might be to detect malicious requests.

While the various examples herein are directed towards protocol analysis via the protocol definition (files) and protocol definition extensions, the technology may be adapted to any form of parsing, and thus protocols are only examples. For example, the extension paradigm described herein may be used for any data parsing in general, such as in file parsers. Other aspects of parsing data and evaluating that data may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data processing in general.

Figure 1:
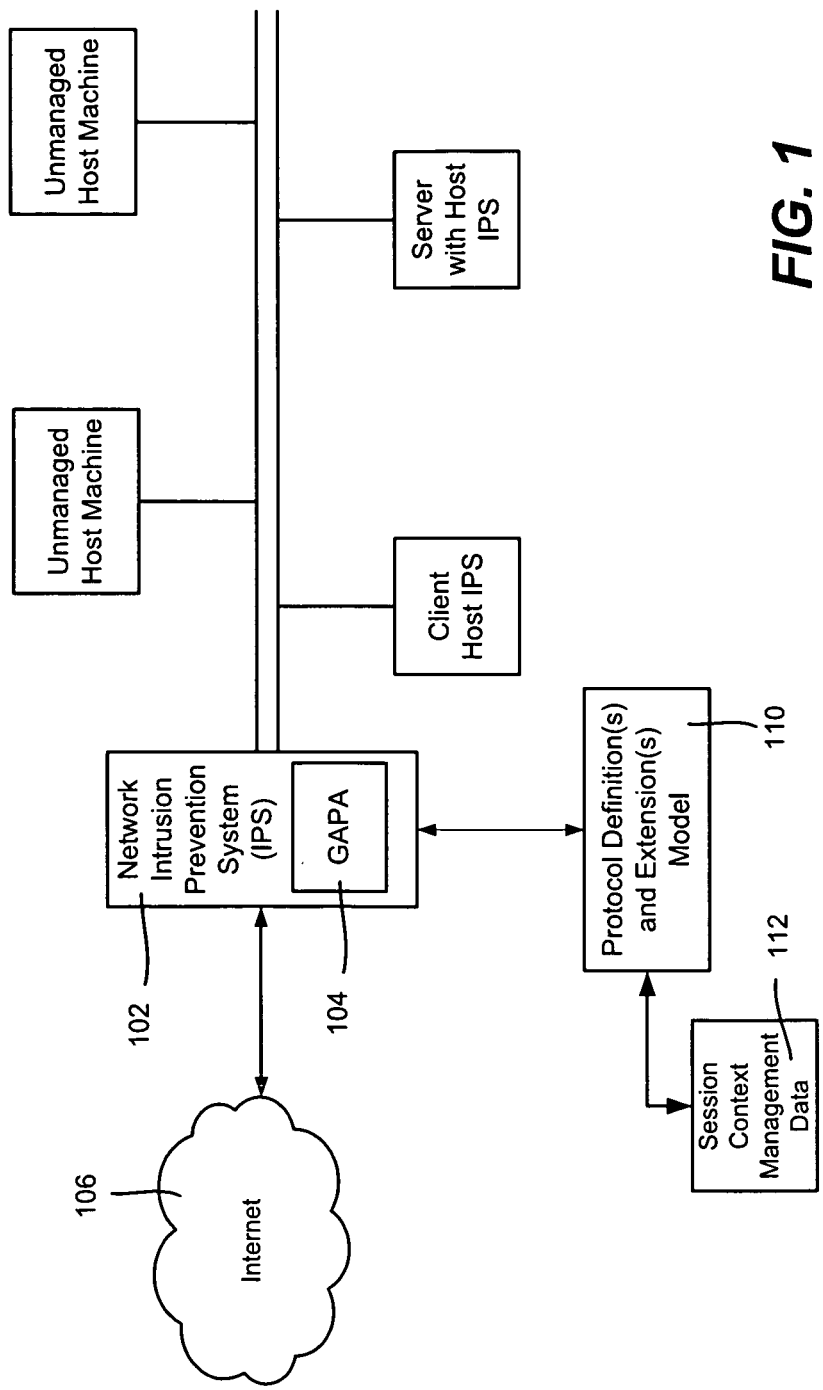
FIG. 1 is a block diagram representing example environment in which a network intrusion prevention system (and/or intrusion detection system) engine, including a generic application-level protocol analyzer, evaluates network traffic via protocol definitions and protocol definition extensions.

Turning to FIG. 1, there is shown an intrusion prevention system 102 that is based on a generic application level protocol analyzer (GAPA) 104. Note that as used herein, "intrusion prevention" is equivalent to "intrusion detection" for purposes of brevity in this description. In general, as described in U.S. patent application publication no. 20070112969, (herein incorporated by reference), parsing operations are performed by the generic application level protocol analyzer 104 based on provided data; the analyzer 104 uses the data to detect matching tokens based on network traffic to and/or from the Internet 106. Note that any machine in the network, e.g., server or client, may also host an intrusion prevention system that uses the technology described herein.

By way of example, the analyzer 104 may communicate with some logic to determine that a comma token is to be detected, and when detected, may communicate again to determine that two consecutive slash characters are to next be detected, and so on. The logic may be more complex than simply providing a next expression set to match, but in general, the analyzer 104 parses and/or matches data as directed by the logic. Also, the analyzer 104 provides an API for coupled logic to get and set variables, and/or specify that part of the network traffic is to be buffered, e.g., rather than simply having the analyzer discard data (e.g., characters) that are not matches with the expression currently specified by the logic.

To provide the analyzer with such data, protocol definitions and protocol definition extensions are provided as a model 110. In one implementation, protocol definitions and protocol definition extensions internally use a lex and yacc-like structure to specify parsing constructs, using BNF rules and regular expression tokens. They may also contain inline code within any rule. This code is treated as a visitor to the rule it is within; during execution, when the rule is encountered, the visitor code will be run as well. As described below, the model may maintain session context management data 112.

Figure 2:
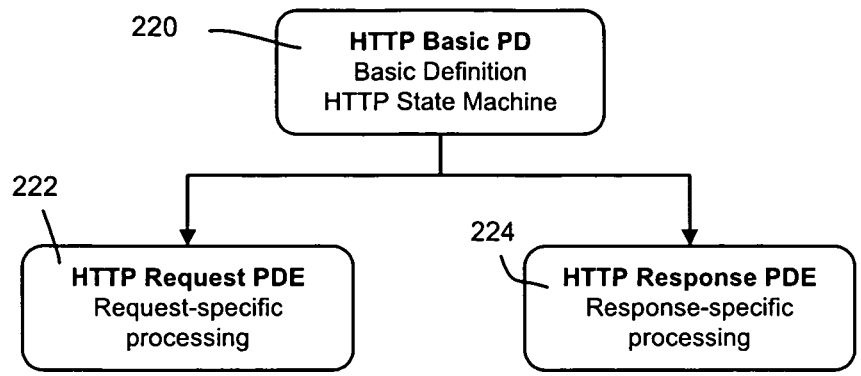
FIG. 2 is a representation of an HTTP-based model tree structure with a protocol definition and two protocol definition extensions.

As one illustrative example, FIG. 2 shows how the HTTP protocol can be split up into a three-part protocol definition and extension model, namely a protocol definition 220 driving a protocol state machine, and two separate protocol definition extensions (modules) 222 and 224, one for request and another for response-specific parsing, respectively.

Protocol definition extensions and signatures specify a parent module and a condition, referred to in this example as an "InvokeOn" condition, under which each needs to be invoked. For example, in the HTTP example of FIG. 2, the Request protocol definition extension may specify that it is to be called whenever the HTTP verb starts with a "GET", by having that as its InvokeOn condition. Thus, while all HTTP messages in a network stream parser scenario will be seen by the HTTP Basic protocol definition 220, HTTP requests will only be processed by HTTP Request protocol definition extension 222, and likewise HTTP responses will only be processed by the HTTP Response protocol definition extension 224.

The Request protocol definition extension module 222, and similarly the Response protocol definition extension module 224, each specify the HTTP Basic protocol definition 220 as its parent. Note that a protocol definition also may specify a parent module, in which case it also needs to specify an InvokeOn condition. This condition specifies the relationship of a module to its parent.

In this manner, protocol layering relationships can be described in a natural way with the extension model, that is, lower-layer modules can further extend the functionality of their parent without needing the parent to be aware of its children modules. Due to this modular approach, optimizations may be performed, such as pruning the protocol definition/protocol definition extension hierarchy based upon need, and/or targeting specific network traffic with an appropriate protocol definition/protocol definition extension to provide fine-grained control between general and specific parsing.

As mentioned above, performance is a concern when dealing with a parsing process. The extension model addresses performance by optimizing the parser to do reduced (e.g., minimal) parsing without sacrificing flexibility or expressiveness. In general, the parsing engine aims to determine and focus on the areas of interest, while skipping over other parts to the extent possible.

In the extension model, each parsing element (protocol, format, and so forth) may be described with one protocol definition, and with possibly one or more protocol definition extension, linked to the parent protocol definition by specifying that parent, and specifying an InvokeOn condition to indicate when the extension is to be called.

By way of example, the extension model may be used in a live network stream parsing environment to describe protocol layering and maintain per-conversation protocol state. As described above, the model extends naturally to support layering, in that layering may be described as protocols extending other protocols.

In order for an extension model 110 to be accessed, a dependency tree of the protocol definitions and protocol definition extensions is created to globally describe the relationships among them. This may be performed by recursively building the tree from the parent protocol definition information of each protocol definition. Top-level protocol definitions are detected as those that do not specify a parent. This process may produce multiple trees, one per top-level entity, corresponding to multiple interception points. One example of a dependency tree in a network traffic parsing scenario represented in the model of FIG. 3.

Figure 3:
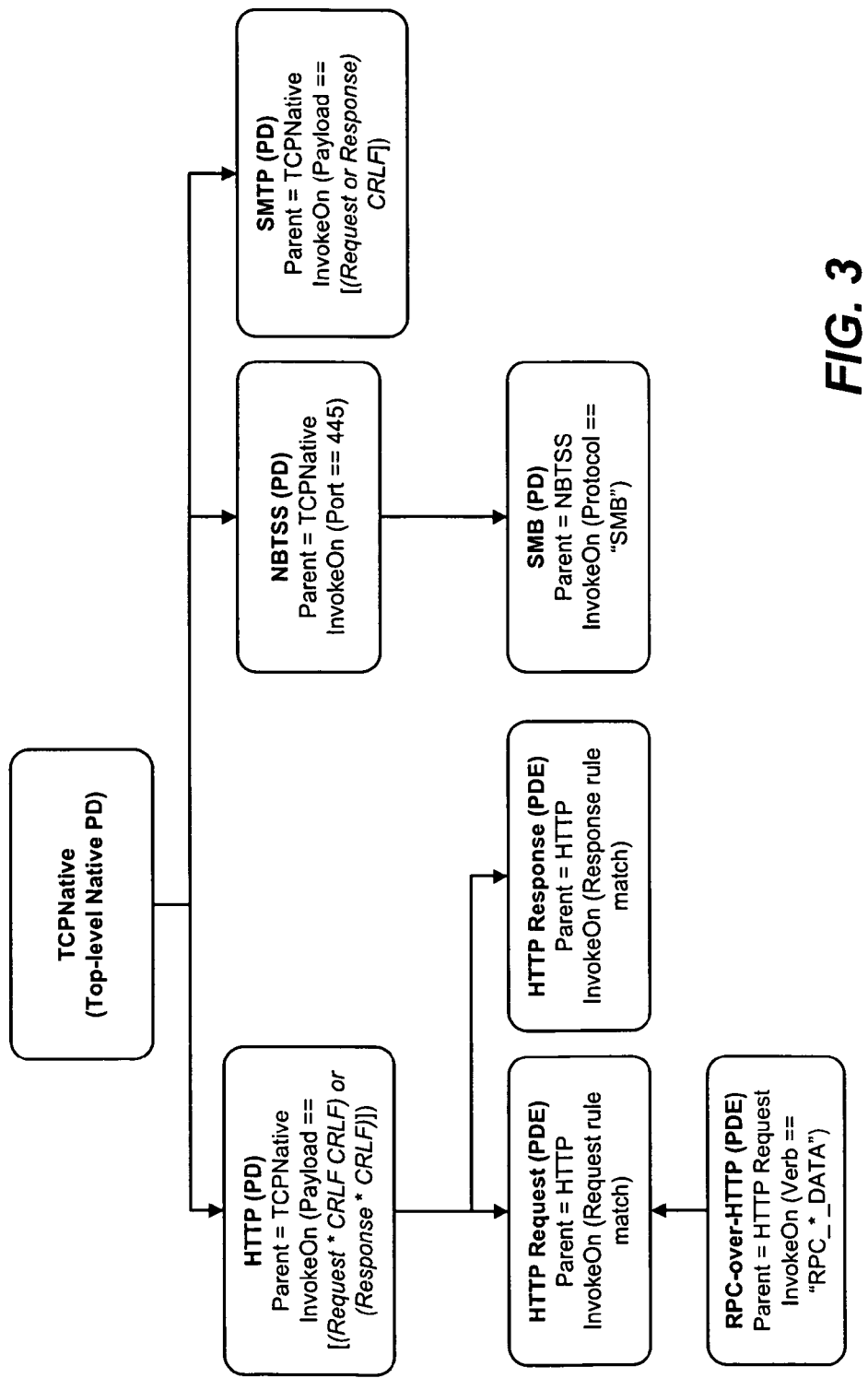
FIG. 3 is a representation of a protocol-based model tree structure for parsing data arranged in layered protocols.

As can be seen in FIG. 3, each child, whether a protocol definition or protocol definition extension, specifies its parent, which can also be a protocol definition or protocol definition extension (although a protocol definition that is not an extension cannot be a child of an extension in this implementation example). Each child also specifies when it is to be invoked by its parent; note that it is feasible to have an implementation in which a child may specify when it is not to be invoked, e.g., always invoke except when a specified condition or set of conditions is met.

Figure 4:
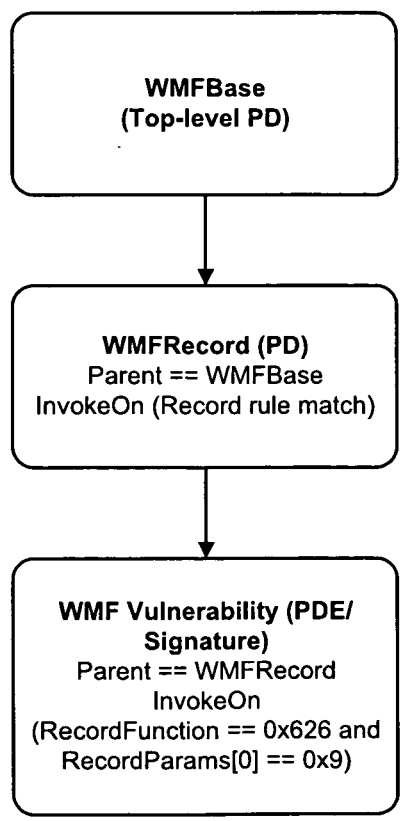
FIG. 4 is a representation of a Windows® Metafile-based model tree structure including a child module for detecting a specific vulnerability.

As described above, the extension model can be used for parsing in general, not just for network-class scenarios. By way of example, WMF (Windows Metafile) parsing and PNG (Portable Network Graphics) 1.2 graphics file parsing can be described using the models represented in FIGS. 4 and 5. In the example of FIG. 3, the WMF model detects the presence of SetAbortProc-type records in WMF files, which is the basis for a known WMF vulnerability that existed in the year 2005 through 2006 timeframe. This detection can be accomplished by using attaching a protocol definition extension, or a signature under record processing protocol definition, with the following InvokeOn condition:

RecordFunction==0x0626 && RecordParameters[0]
   =0x0009

Figure 5:
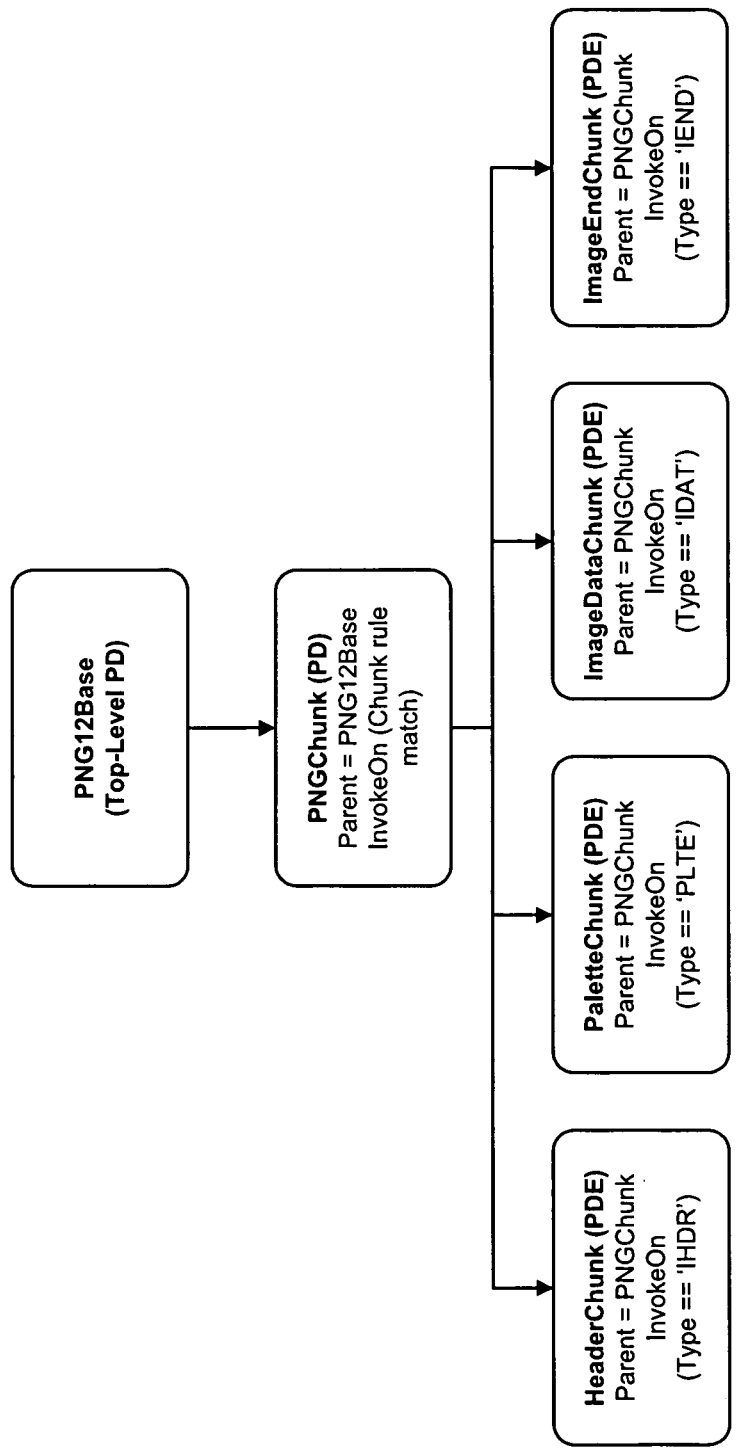
FIG. 5 is a representation of a portable network graphics-based model tree structure including a child module for detecting a specific vulnerability.

As another example, the dependency tree represented in FIG. 5 may be used to detect the known MS005-009 PNG processing vulnerability. This is accomplished by placing a signature under the HeaderChunk protocol definition extension that checks for images that have excessive width and height parameters.

As can be seen, parsing can be as general or specific as desired, depending on which modules are present in a model. At the same time, because of the parent/ child tree structure module that becomes more specific as the levels get lower, each module does not have to deal with anything its parent has (more generally) already dealt with.

Turning to an aspect referred to as rule visitors, visitors comprise code blocks (inline code in protocol definitions or protocol definition extensions, or obtained from signatures) that are called at specific points in parsing, namely when a rule is executed. InvokeOn statements from children modules are treated as visitor code blocks of the rules they reference.

In one implementation, each protocol definition or protocol definition extension rule has a pre-process and post-process visitor, more simply referred to as pre-visitor and post-visitor. For instance, the pre-visitor may tell the engine to start forwarding data to the next layer protocol, while the post-visitor can tell it when to stop. In this way, a module can have control over how much data to buffer for the next layer.

Turning to managing layering, the InvokeOn information may be processed during the creation of the dependency tree. For each protocol definition or protocol definition extension that has a parent, the invocation condition check is inserted as a visitor in the parent module, on the rule it references. For example, to define a simple relationship between HTTP and TCP, HTTP's parent may be specified as TCP, with the HTTP's InvokeOn condition testing whether the local port is 80. During processing, a pre- and post-visitor are placed on TCP's local port rule, testing HTTP's InvokeOn condition. If that holds true, then the next-level protocol jump is to HTTP.

Session context management maintains per-conversation state and for example may be used to support simultaneous multiple active conversations. The information that is required to distinguish one session from another depends on the protocol or protocols used in that session. For example, for general TCP flows, the 5-tuple (remote/local IP and port and protocol ID) data are sufficient to distinguish sessions from one another. However, other protocols under TCP may need to further extend this definition. For example, there may be multiple SMB sessions over the same logical connection, which need more information than the TCP 5-tuple in order to tell them apart. To handle this, the protocol definition/protocol definition extension modules can specify what information needs to be kept in session contexts. This information is treated as a binary blob by the engine and typically includes state machine information and protocol definition/protocol definition extension-specific data.

Figure 6:
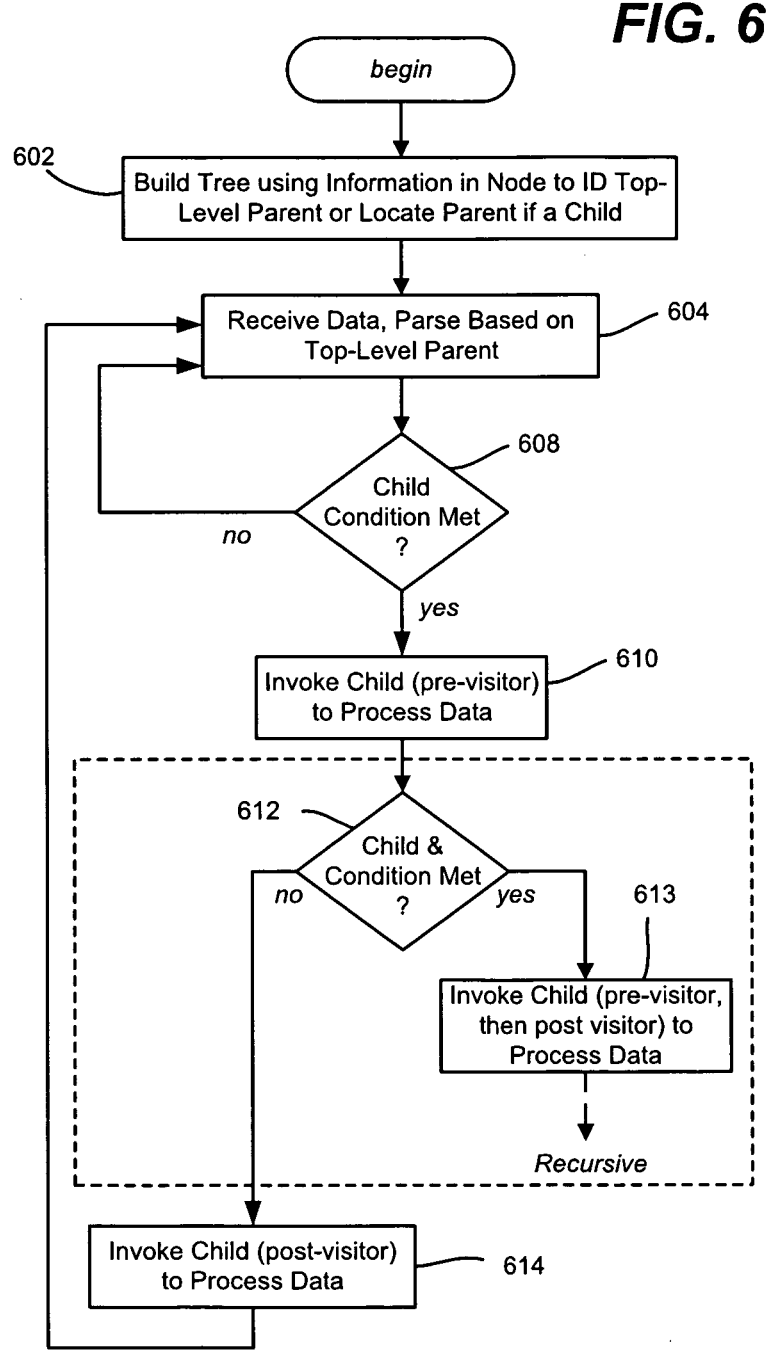
FIG. 6 is a flow diagram representing example steps taken to parse data via a tree-like model structure.

By way of summary, FIG. 6 shows example steps that may be taken when parsing data, beginning at step 602 which represents building the model as a tree-like structure. Step 604 represents receiving data at the engine and communicating the top-level parent node or nodes to see if any top-level node wants to process the data.

To this end, the top-level node determines via step 608 whether a child condition is met, e.g., the data was received at a certain port, or contains a certain character or string that meets a child's invoke condition. If so, step 610 invokes the child to process the data, e.g., in the pre-visitor mode.

As part of the processing, step 612 represents the child looking for a condition of one of its direct children, if any being met. If so, step 613 is executed, and so on, recursively, until a node representing a module is reached that does not have a child, or has at least one child but no condition for invoking a child is met.

When done pre-visitor processing, post-visit processing is performed via step 614. Again, this may be nested recursively, going back up until the highest parent below the top-level node has completed its processing.

Exemplary Operating Environment

Figure 7:
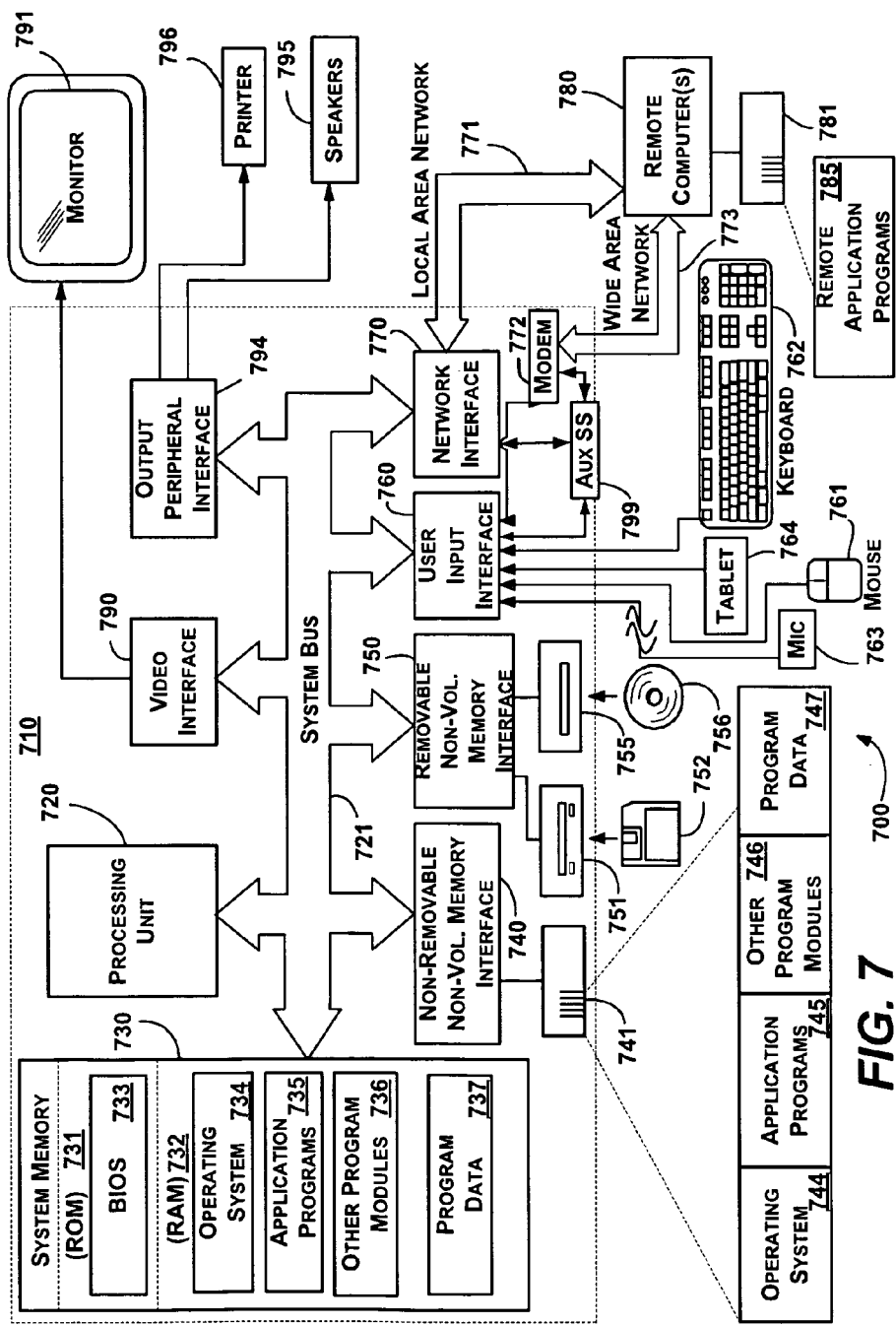
FIG. 7 shows an illustrative example of a computing environment into which various aspects of the present invention may be incorporated.

FIG. 7 illustrates an example of a suitable computing and networking environment 700 on which the examples of FIGS. 1-4 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, embedded systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during startup, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 795, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a computer-implemented method comprising:
   receiving, by an intrusion detection engine implemented on at least one processor, data corresponding to network protocols;
   parsing the data, including arranging a plurality of modules in a tree-like structure, the plurality of modules including at least one parent module and at least one child module, the at least one parent module comprising a protocol definition and the at least one child module comprising a protocol definition extension, in which a child module specifies a parent module and specifies a condition set containing at least one condition that, in response to the at least one condition being met, prompts the parent module to invoke the child module, the parent module parsing the data corresponding to the network protocols to determine whether to invoke the child module;
   processing a selected module of the plurality of modules to determine whether the selected module has a parent module associated therewith; and
   responsive to determining that the selected module does not have a parent module associated therewith, designating the selected module as a top-level parent module.

2. The computer-implemented method of claim 1 further comprising:
   responsive to determining that the selected module has a parent module associated therewith, locating the parent module and positioning the selected module as a child module under the parent module and providing the parent module with the condition set for invoking the child module during parsing of the data.

3. The computer-implemented method of claim 1 wherein parsing the data comprises parsing network traffic.

4. The computer-implemented method of claim 1 wherein the condition set includes a condition that specifies a port or other attribute of incoming or outgoing data.

5. The computer-implemented method of claim 1 wherein the condition set includes a condition on the data.

6. The computer-implemented method of claim 1 wherein the child module corresponds to a signature, wherein the child module specifies that the child module is to be invoked by the parent module in response to that signature being present in parsed data, and wherein the child module includes processing directed towards detecting that signature.

7. The computer-implemented method of claim 1 wherein the child module includes a rule and visitor code associated with that rule, and further comprising:
   running the visitor code in response to encountering the rule during execution.

8. The computer-implemented method of claim 7 wherein the visitor code associated with the rule corresponds to a pre-process and post-process visitor.

9. The computer-implemented method of claim 1 further comprising:
   maintaining session context management data in association with at least one of the modules.

10. In a computing environment, a system comprising:
    memory coupled to a bus system, the memory comprising computer useable program code;
    one or more processing units, the one or more processing units configured to execute the computer useable program code to implement a parsing engine, the parsing engine configured to parse data corresponding to network protocols; and
    a tree-structured model comprising a plurality of modules, including at least one parent module having at least one child module, the at least one parent module comprising a protocol definition and the at least one child module comprising a protocol definition extension, the parsing engine configured to access the tree-structured model to parse the data, including:
       invoking the at least one parent module from a top-level module based upon a condition being met, the at least one parent module providing processing for parsing the data and invoking the at least one child module for further processing upon another condition being met, the at least one child module specifies the at least one parent module and the other condition that prompts the at least one parent module to invoke the at least one child module;
       processing a selected module of the plurality of modules to determine whether the selected module has an associated parent module; and
       responsive to determining that the selected module does not have an associated parent module, designating the selected module as a top-level parent module within the tree-structured model.

11. The system of claim 10 wherein the at least one child module contains information that specifies its parent module and the condition for the at least one parent module to invoke the at least one child module.

12. The system of claim 10 wherein parsing the data corresponds to network traffic.

13. The system of claim 10 wherein parsing the data corresponds to network traffic, and wherein the condition for invoking the at least one parent module from the top-level module is based on a port at which the network traffic was received.

14. The system of claim 10 wherein the condition for invoking the at least one child module is based on a condition on the data.

15. The system of claim 10 wherein the at least one child module includes logic for detecting known processing vulnerabilities.

16. The system of claim 10 wherein the at least one child module is a parent to at least one other child module that is invoked upon another condition being met.

17. The system of claim 10 further comprising:
    a set of session context management data that is maintained in association with the tree-structured model.

18. One or more computer storage devices having computer-executable instructions, which on execution by a computer, cause the computer to:
    receive, by a parsing engine implemented on at least one processor, data corresponding to network protocols; and
    parse the data based on a plurality of modules arranged in a tree-like structure, in which a child module specifies a parent module and a condition set containing at least one condition for the parent module invoking the child module, the parent module comprising a protocol definition and the child module comprising a protocol definition extension, the parent module parsing the data corresponding to the network protocols, and evaluating the data to determine whether to invoke the child module, and responsive to the at least one condition specified by the child module being met, the parent module invoking the child module as a rule visitor during the parsing;
    process a selected module of the plurality of modules to determine whether the selected module has an associated parent module; and responsive to determining that the selected module does not have an associated parent module, designate the selected module as a top-level parent module.

19. The one or more computer storage devices of claim 18 further comprising:

responsive to a determination that the selected module does have an associated parent, locate the associated parent module and positioning the selected module as a selected child module under the associated parent module and provide the associated parent module with the condition set for invoking the selected child module.

20. The one or more computer storage devices of claim 18, wherein the child module corresponds to a signature, wherein the child module specifies that the child module is to be invoked by the parent module in response to that signature being present in parsed data, and wherein the child module includes processing directed towards detecting that signature.

\* \* \* \* \*